United States Patent [19]

Chapman

[11] Patent Number: 5,499,885
[45] Date of Patent: Mar. 19, 1996

[54] APPARATUS FOR JOINING STRUCTURAL COMPONENTS

[76] Inventor: William A. Chapman, 2706 S. Horseshoe Dr., Naples, Fla. 33942

[21] Appl. No.: 58,871

[22] Filed: May 6, 1993

[51] Int. Cl.$^6$ .............................. F16B 1/00; E02D 27/42
[52] U.S. Cl. .................. 403/380; 403/297; 403/371; 52/296
[58] Field of Search .................... 52/655.1, 296; 403/380, 376, 363, 364, 345, 297, 168, 371; 248/519, 523, 347, 558

[56] References Cited

U.S. PATENT DOCUMENTS

| | | | |
|---|---|---|---|
| 2,229,075 | 10/1939 | Haggart, Jr. | |
| 2,952,484 | 9/1960 | Zoltok | 287/54 |
| 3,189,962 | 6/1965 | Hartwell | 403/371 |
| 3,437,362 | 10/1966 | Offenbroich | 287/124 |
| 3,653,169 | 4/1972 | Jenner | 52/296 |
| 3,894,375 | 7/1975 | Lindberg, Jr. | 52/298 |
| 4,318,629 | 3/1982 | Yamamoto | 403/297 |
| 4,570,408 | 2/1986 | Frascaroli | 52/726 |
| 4,793,111 | 12/1988 | Shewchuk | 52/298 |
| 5,102,254 | 4/1992 | Yeh | 403/297 |

FOREIGN PATENT DOCUMENTS

| | | | |
|---|---|---|---|
| 2109500 | 6/1983 | United Kingdom | 403/380 |

*Primary Examiner*—Richard A. Bertsch
*Assistant Examiner*—William Wicker
*Attorney, Agent, or Firm*—Myron E. Click

[57] ABSTRACT

Method and apparatus for joining a first structural element, having a passageway formed therein which opens to the exterior thereof, to a second element. A plurality of members are assembled into a joining device which is then nested inside of the passageway. The members are then moved with respect to each other to enlarge the size of the joining device so that the members engage the wall of the passageway in supporting contact therewith. The members of the enlarged joining device are then secured together into a unitary support block, with the members in supporting contact with the passageway wall. The unitary support block is connected to the second element. Unique member components, member securing means, member moving means, and the like form a new and useful apparatus.

59 Claims, 5 Drawing Sheets

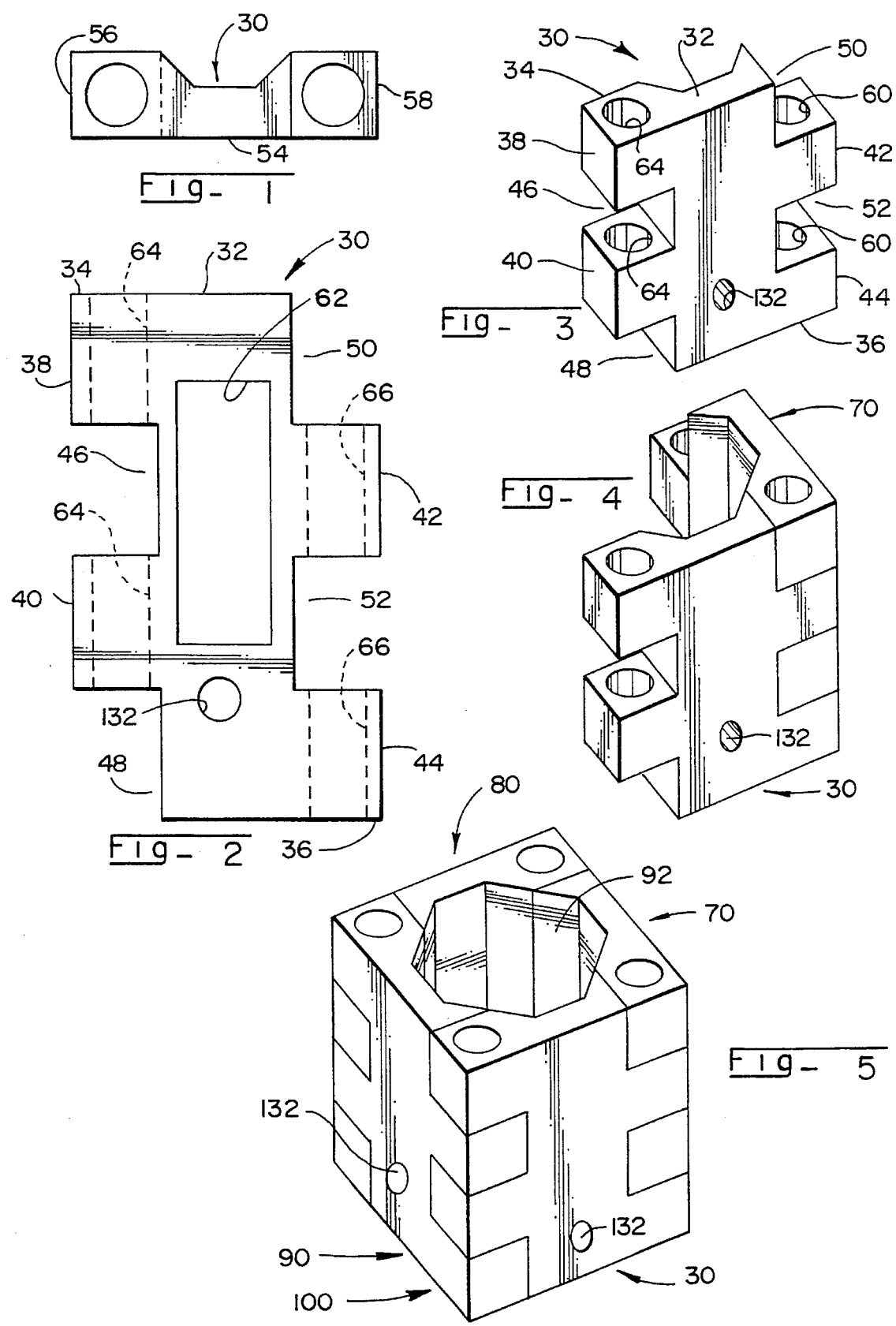

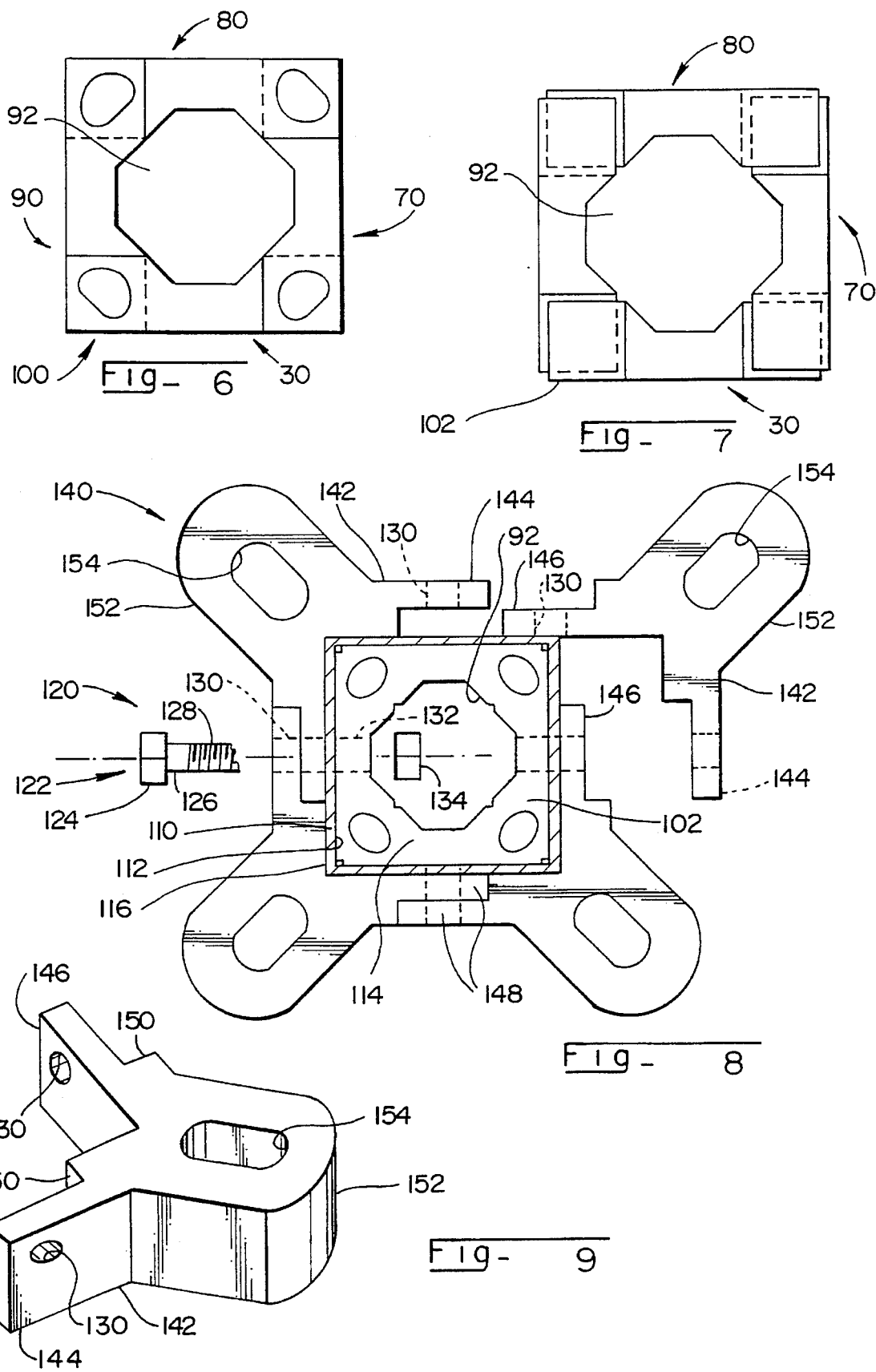

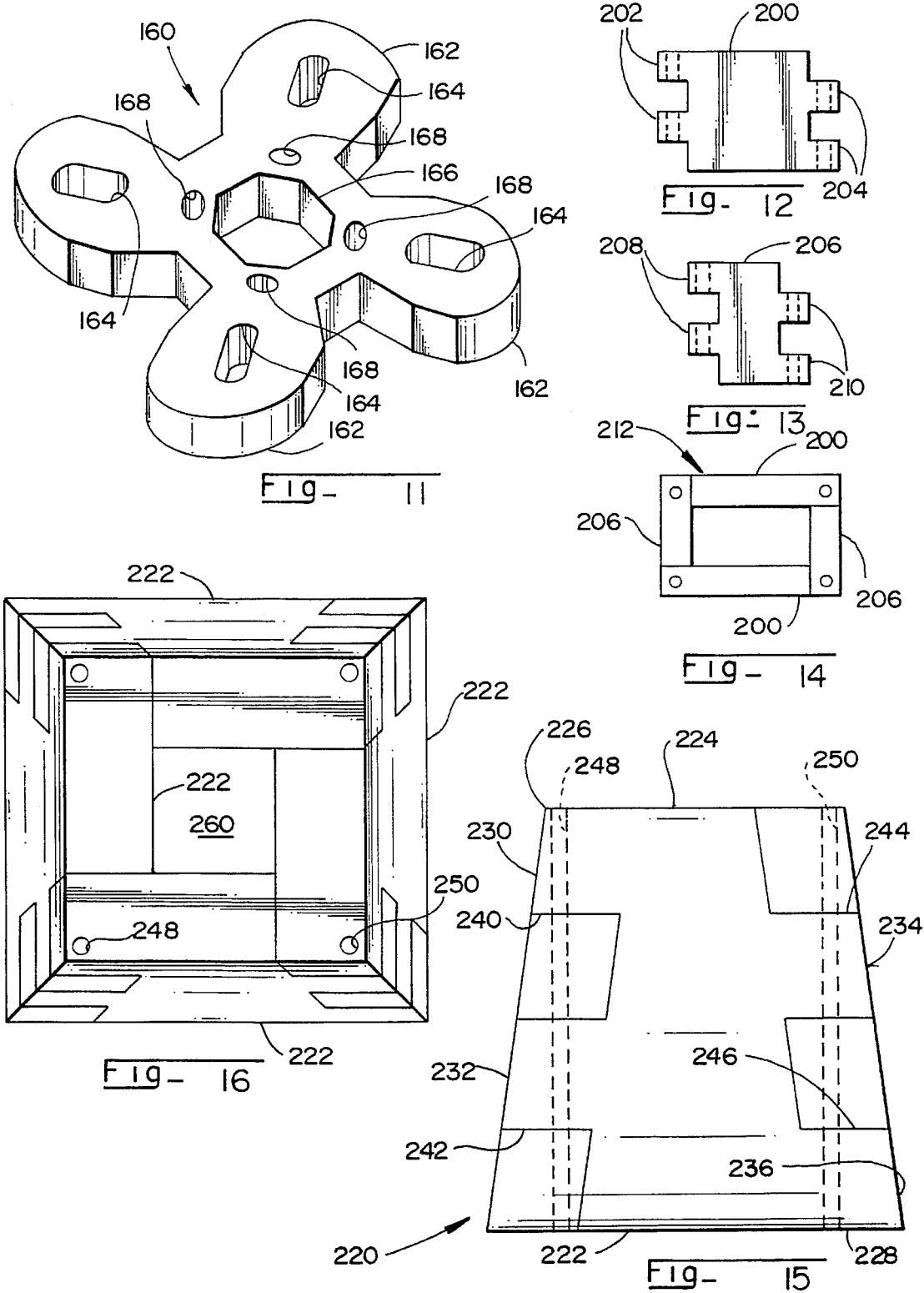

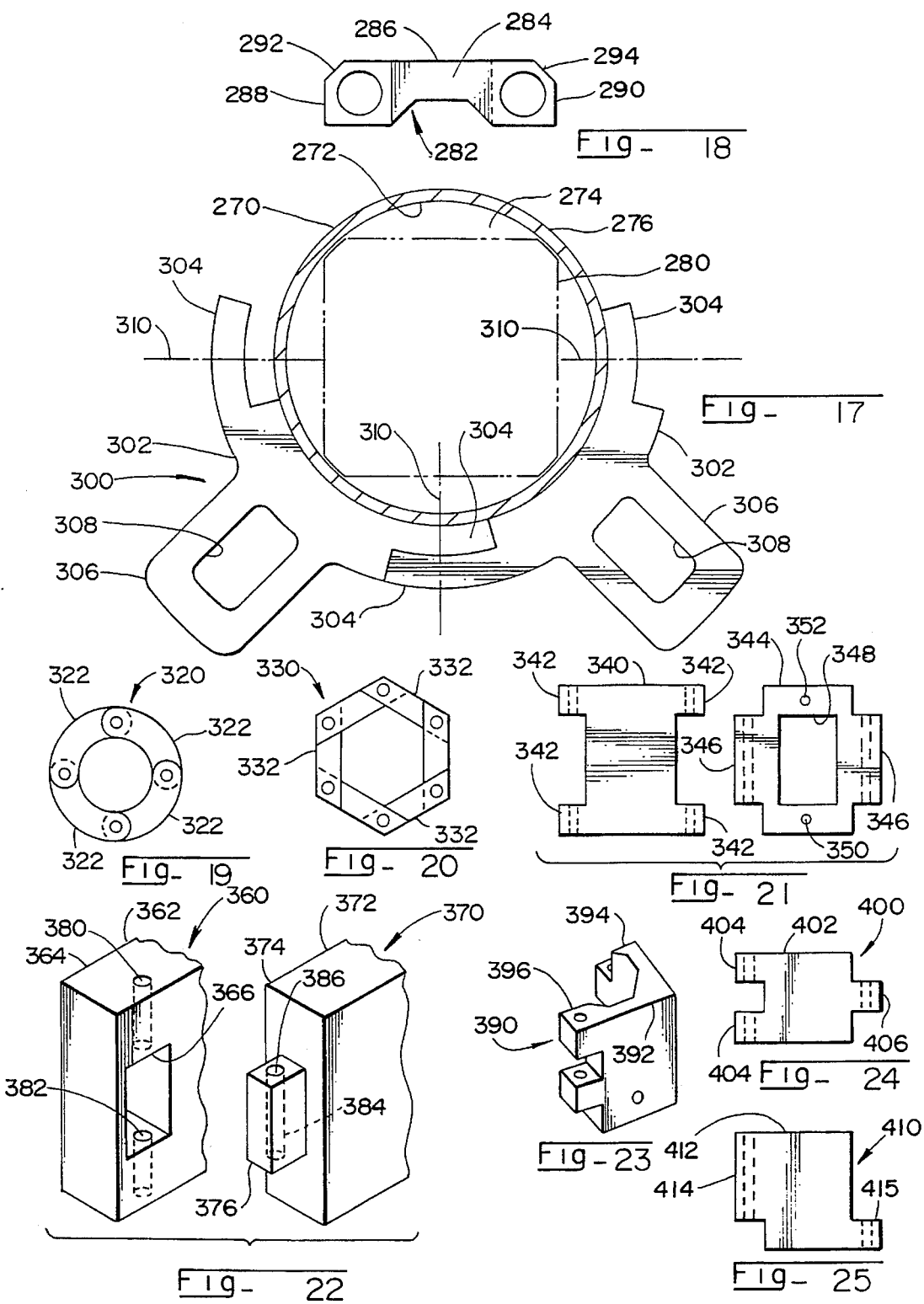

5,499,885

APPARATUS FOR JOINING STRUCTURAL COMPONENTS

BACKGROUND OF THE INVENTION

1. Field of the Invention

This invention relates to method and apparatus for joining structural components generally and, in particular, to joining first and second structural components when the first component is a tubular type element having an inner wall surface defining an internal duct and an outer wall surface surrounding the internal duct.

2. Description of the Prior Art

There are a number of applications where a tubular type component needs to be joined, connected or otherwise attached to another component. For example, vertical building modules use hollow vertical columns which must have their lower ends connected to a base. Further, in such building application, tubular type components can be used as beams, which again require joining methods and apparatus.

Other applications include building frames or other structures from tubular type elements, such as truck beds or trailers for semi-trailer trucks. If the tubular elements are formed from aluminum, then important weight reductions can be achieved which translate directly into increased payloads and improved profits.

One of the most extensively used of such connections are utility pole assemblies for street and highway lighting, electric wire carriers, and for other vertical standard uses.

These poles may be made from many materials which are suitable for their intended application, e.g. steel, aluminum or other materials. Most are elongated and tubular. Aluminum is very popular because of its light weight and corrosion resistant qualities.

The most common method of attaching a tubular pole is to weld the lower end of the pole to a base plate which is then connected to an anchor structure. However, welding causes a loss of temper and yield strength. Thus, if the yield strength of an aluminum pole is 25,000 psi, welding will decrease the loading capacity by as much as 57 percent. Therefore, it is preferable to mechanically fasten the pole to a base plate to retain the yield strength and loading capacity. Then a lighter pole can be used which will have the same loading capacity as a larger and more expensive pole which has been attached by welding, particularly since the quality of a weld can vary from piece to piece.

The most popular mechanical fastening method is to use a fixed size inner sleeve which the tubular pole fits over. The inner sleeve may be previously attached to a base plate with provisions for attaching the base plate to an anchor means. The problem with this method is in controlling the size tolerance of both the fixed size inner sleeve and the size tolerance of the internal duct of the tubular pole. In order to have a stable connection, the tolerance between the sleeve and the internal duct must be very close. Unfortunately, in the manufacturing process the desired tolerance cannot be maintained without adding considerable expense to the process.

When the inner sleeve is too small, the pole fit is loose and a hinge effect will occur. This not only reduces the initial load capacity, but permits additional reductions in capacity if the pole metal is fatigued with the pole motion as time passes. If the inner sleeve is too large and is jammed into the tube duct, a shear problem may occur. In any event, the stretching of the pole by an oversized inner sleeve will stress the pole, and may actually cause a rupture, hairline crack, or the like.

Since the problems in this general area are most readily apparent in the joining of tubular pole to an anchor base, and since most of the pertinent prior art is related to tubular pole or similar structural components, this invention will be set forth in that context. While the invention is particularly well suited for and advantageously used with tubular poles, it must be kept in mind that protection is sought in all of the applications for this invention, including those discussed above and hereinafter and in which the invention may be used whether specifically discussed herein or not.

U.S. Pat. No. 4,793,111 discloses a method for mechanically securing a pole to a base without using welding, by using a special extrusion to form an extruded tube wall and a plurality of pairs of elongated rib members co-extruded with the wall to form arcuate races. Clamp members are added to form a complete bore. Each of the bores are then threaded. This is a more expensive process than forming a standard, off-the-shelf, tubular pole. In addition, the use of steel bolts threaded into aluminum threads creates another problem because the steel threads are stronger, e.g. 110,00 psi to 25,000 psi. This will probably in time result in weakened aluminum threads and shearing of the anchor base from the pole.

U.S. Pat. No. 3,894,375 discloses a tubular pole base set in concrete to receive a tubular pole. A wedge in the pole base is jammed against the outside of the pole to hold the pole in place in the base. This is not an effective way to retain an aluminum pole, because it places an unequal stress on the more fragile aluminum.

U.S. Pat. No. 2,952,484 discloses a tube connector for joining tubular lamp standards. That is, a vertical tubular pole is joined to a cantilever arm extending from the top of the pole. The tube connector includes a junction tube which has its upper end welded to the inside of the lower end of the cantilever tube. The junction tube is split vertically to enable it to be expanded after insertion into the tubes it is joining.

Two pairs of expansion blocks are spaced apart inside the junction tube and held in the spaced apart position by opposed elongated straps. The straps are each welded to the inside of the junction tube. Each pair of the expansion blocks are independently expandable.

The only connection of the junction tube to the lower end of the cantilever tube is welding, with all of the attendant problems discussed hereinbefore. Moreover, the welding requires an additional assembly step. Further, since the lower portion of the junction tube is not positively joined or connected to the upper end of the vertical tubular pole, slippage between the junction tube and the inside of the vertical tube pole can happen. This occurs as a result of constantly changing wind loads on both the vertical tube and the cantilever tube, with torque loads on all parts of the tube connector constantly changing. Therefore, the expansion bolts which are freely mounted in blind apertures tend to work backwards in the screw threads on the other end, assisted by the pressure of the expansion blocks in trying to return to a position closer together. This allows the junction tube to retract away from the inner wall of the top of the vertical tube causing slippage and a hinging action between the cantilever—junction tube combination and the vertical pole. The hinging movement further aggravates the slippage, and also creates metal fatigue problems. Finally, all the tube connector parts are not secured to each other into a unitary structure after expansion, as the present invention is, to avoid the problems discussed above.

U.S. Pat. No. 3,437,362 also discloses an expanding device for joining tubular elements used for erecting stand assemblies, scaffolding, shelving and the like. As in the just-discussed U.S. Pat. No. 2,952,484, expansion is obtained by advancing a screw with a specially machined forward end, which engages in cam fashion three other parts to expand all four parts away from each other against the inner walls of a tubular member. In the other embodiments, the same camming action in response to screw advancement occurs. Once again, there is no means for securing the expanded members together in their wall contact position into a unitary structure. Therefore, as in the just-discussed patent, torque will eventually cause the advancing screw to retreat and the expanded members to retract and lose inner wall contact and their joining capability. While this structure might be suitable for shelving and the like, it would not be useful for installations with constantly changing loading such as wind loading. Further, this structure does not have any formation for wire passages through the expansion device in those instances where needed.

U.S. Pat. No. 4,318,629 discloses a clamp member that can be advanced by a screw to engage the inner wall of a tubular frame member to bring the opposing inner wall of the frame member against the clamp member support. Once again, there is no provision for securing the clamp mechanism into a unitary structure to maintain its wall engaging contact.

U.S. Pat. No. 3,653,169 discloses a square or rectangular socket extending upwardly from a base to receive a like-shaped hollow column. There are expandable means that fit inside the hollow column to push the column walls out against the sleeve. However, this system depends upon the sleeve being welded to the base, with the attendant problems discussed hereinbefore. Further, there is no way to provide a wire-way passage through the expandable means if the installation requires it. This system would be very expensive to manufacture. Finally, there is no way to secure the expandable means into a unitary structure.

Accordingly, it is an object of this invention to provide an improved method and apparatus for joining a first component, having a passageway formed therein which opens to the exterior of the first component, to a second component. Such first component may be a tubular wall forming an elongated tubular element having an inner wall surface defining an internal duct, and an outer wall surface surrounding the inner wall surface and the internal duct. Such second component may be another structural component, an anchor means or device, a frame structure, a support element, or other element.

It is a further object of this invention to provide an improved method and apparatus for joining such a first component to a second component which utilizes an expandable means for insertion into or nesting in a passageway or duct or the like. The expandable means is then expanded into supporting and engaging contact with the passageway wall or internal duct inner wall, and is secured into a unitary structure in such supporting engaging contact position.

It is a still further object of this invention to provide the method and apparatus described above which utilizes parts which can be easily and inexpensively manufactured, and which can be utilized with less expensive off-the-shelf tubular elements and readily available anchor means.

Other objects, advantages, and features of this invention will become apparent when the following description is taken in conjunction with the accompanying drawings.

SUMMARY OF THE INVENTION

Apparatus is disclosed for joining first and second structural components, when the first component has a passageway formed therein which opens to the exterior of the first component.

In the preferred embodiment, a plurality of link members are used, with each of the link members having a wall portion with opposing end portions. Each of the wall end portions of each of the link members have either tenon means formed on or tenon means receiving space formed therein for enabling assembly of the plurality of link members into a coupling device by inserting a tenon means on one wall end portion of a link member into tenon means receiving space formed in an adjacent wall end portion of another link member. The coupling device is to be placed inside of the passageway formed in the first structural component.

Means are provided for radially moving at least one of the plurality of link members of the coupling device with respect to the other link members to expand the size of the coupling device so that link members thereof are in engaging contact with a wall of the passageway in the first structural component in which the coupling device has been placed.

Means are then used to secure the assembled link members of the expanded coupling device to each other into a unitary structure in the passageway wall contact engaging position. The unitary structure is then attached to the second structural component. The unitary structure is also advantageously connected to the first structural component when the unitary structure is inside of the passageway formed in the first structural component.

The radial moving means may include means for pulling the link members radially into the passageway wall engaging position. The pulling means may include means for engaging the link members and means for engaging the first structural component, whereby the coupling device can be connected to the first structural component when the coupling device is in the passageway thereof.

The means for attaching the unitary structure to the second structural component may include a collar member which is disposed around the outer wall surface of the first structural component which surrounds the passageway formed therein. Means are provided for connecting the collar member to the unitary structure when it is placed in the passageway. Means are formed on the collar member for enabling connection of the collar member to the second structural component.

The collar member may comprise a plurality of segments for ease of installation of the collar member around the outer surface of the first structural member. Each segment may have end portions which overlap with end portions of adjacent segments. The means for connecting the collar member to the unitary structure are applied at the overlapping segment end portions to join the segments together into a complete collar member as well as connecting the collar member to the unitary structure.

The unitary structure securing means may include aligned bores formed in a wall end portion having tenon means receiving space formed therein of a first link member, and formed in tenon means formed on a wall end portion of an adjacent link member which is inserted into the tenon means receiving space of the first link member. Means insertable through the aligned bores are provided for releasably securing the link members together.

In one embodiment, tenon means are formed on both of the opposed wall end portions of a link member. The tenon means on adjacent wall end portions of the assembly of link members are offset with respect to each other to define the tenon means receiving space to enable tenon means of adjacent wall end portions to intermesh when the link members are assembled into a coupling device.

In the just-discussed embodiment the tenon means preferably have planar surfaces formed thereon, whereby the planar surfaces on tenon means on adjacent wall end portions cooperate to enable sliding engagement of intermeshed tenon means to enhance stability of the coupling device. The planar surfaces are advantageously perpendicular to the axis of the coupling device, the axis being defined by the radial movement of the link members.

Also disclosed herein is a method for joining a first structural element, having a passageway formed therein which opens to the exterior thereof, to a second element. The steps include assembling a plurality of members into a joining device, and nesting the joining device inside of the passageway.

A step of moving the members with respect to each other to enlarge the size of the joining device is performed so that the members engage the wall of the passageway in supporting contact therewith.

Then a step of securing the members of the enlarged joining device together into a unitary support block is accomplished with the members in their supporting and engaging contact with the passageway wall. Finally, a step of connecting the unitary support block to the second element completes the joining method.

Advantageously, a step of connecting the unitary support block to the first structural element as well as the second element will add to the joining strength. Further, the step of connecting the unitary support block to the second element will add to the joining strength. Finally, the step of securing the members together into a unitary support may be expanded to also include the step of connecting the unitary support block to the second element to simplify the method and improve the joining strength.

BRIEF DESCRIPTION OF THE DRAWINGS

In the drawings, where like numerals are employed to designate like parts throughout:

FIG. 1 is a plan view of a link member of this invention;

FIG. 2 is a front elevational view of the member of FIG. 1;

FIG. 3 is a view in perspective of the member of FIG. 1;

FIG. 4 is a view in perspective of two of the members shown in FIG. 1 assembled together;

FIG. 5 is a view in perspective of four of the members shown in FIG. 1 assembled together;

FIG. 6 is a plan view of the assembly shown in FIG. 5;

FIG. 7 is a plan view of the assembly shown in FIG. 5 in which the link members have been moved with respect to each other to enlarge or expand the size of the assembly;

FIG. 8 is a plan view illustrating the assembly of FIG. 7 in place within a tubular element, and which further shows a collar means for connecting the assembly to the tubular element and to an anchor means;

FIG. 9 is a view in perspective of a collar segment;

FIG. 11 is a view in perspective of a base plate utilized in the embodiment in FIG. 10;

FIGS. 12, 13 and 14 are elevational views of two different types of link members and a plan view of those link members assembled together to form an assembly for a tubular element having a rectangular cross-section;

FIG. 15 and 16 are front elevational and plan views, respectively, of an assembly of link members suitable for use with a tapered tubular element;

FIG. 17 is a plan view of another embodiment of this invention illustrating its use with a tubular element having a circular cross-section;

FIG. 18 is a plan view of a link member suited for use in the embodiment shown in FIG. 17, as well as other embodiments;

FIG. 19 is a plan view of another embodiment of a link member assembly suitable for use with a tubular element having a circular cross-section;

FIG. 20 is a plan view of another embodiment of a link assembly which illustrates assembly and link member forms suitable for tubular elements having a polygonal cross-section;

FIG. 21 is an elevational view of two link members that may be used together to provide more room for an access hole to be formed in one of the link members.

FIG. 22 is a view in perspective illustrating a mortise-type slot/tenon combination for assembly of adjacent link members;

FIG. 23 is a view in perspective of a further embodiment of a link member; and

FIGS. 24 and 25 are front elevational views of two further embodiments of link members.

BRIEF DESCRIPTION OF THE PREFERRED EMBODIMENTS

Figure 10:
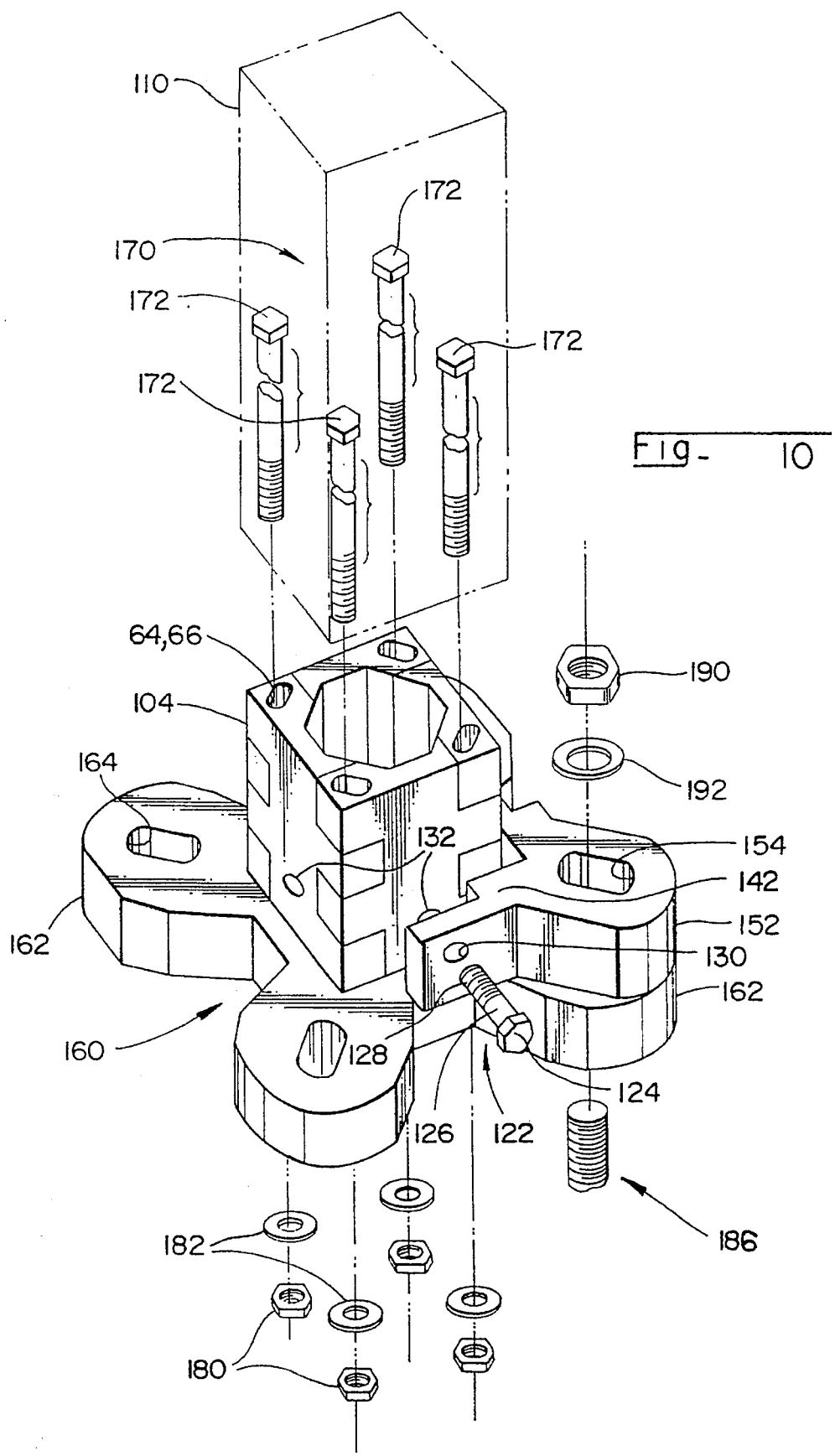
FIG. 10 is an exploded view in perspective illustrating a first embodiment of this invention.

Referring now to FIGS. 1 through 3 there is illustrated a first embodiment of a link member noted generally at 30 which may be employed in this invention. The link members or modules are to be assembled into a coupling or joining device which may be expanded or enlarged in size.

In the embodiment or FIG. 1, this is accomplished by providing the member or module with a wall-type portion 32 which has opposing wall end portions 34 and 36. Projection or tenon means 38 and 40 are formed in or on wall end portion 34. Projecting or tenon means 42 and 44 are also formed in or on wall end portion 36.

Projection or tenon receiving spaces 46 and 48 are formed in wall end portion 34, while such receiving spaces 50 and 52 are formed in opposing wall end portion 36. In this embodiment the receiving spaces 46, 48 are defined by tenon means 38, 40, while receiving spaces 50, 52 are defined by tenon means 42, 44.

Thus, as noted in FIG. 4 and 5, when identical link members or modules of this type are assembled together, the tenon means on an end wall of one link member are offset from the tenon means on an end wall of an adjacent link member so that when such link members are assembled into a joining device the tenon means are intermeshed. It should be noted that the term tenon means includes an individual projection or tenon or a plurality of tenons or projections.

In any of the link member or module embodiments disclosed herein, assembly of the link members into a coupling device 100 is accomplished by inserting tenon means on one wall end portion into tenon means receiving space formed in a wall end portion of another link member.

It should also be noted that while the disclosed link members are unique and specifically designed to give this apparatus advantageous assembly and functional properties, other types of member may be used and different methods of assembly may be used as long as they fall within the unique overall method and general apparatus disclosed herein. That is, the method includes assembly of a plurality of members into a joining device, and nesting the joining device in an internal duct or passageway. At least one of the members is moved with respect to the others to enlarge the size or expand the joining device so that the members engage the wall of the passageway or duct in supporting contact therewith. The members are then secured together into a unitary support block with the members in supporting contact with the passageway or duct wall. The support block is then connected to another structural element, anchor means or the like.

Referring now to FIG. 6, there is a plan view of the assembly 100 of link members which is shown in perspective in FIG. 5. The assembly 100 of FIG. 6 is placed or nested in a passageway or internal duct of a structural component. Then, as shown in FIG. 7, at least one of the plurality of the link members 30, 70, 80 and 90 is moved with respect to the other link members to enlarge the size of or expand the assembly of FIG. 6 so that said link members are engaged in supporting contact with a wall means of a passageway or internal duct. The expanded joining or coupling device is noted generally at 102 in FIG. 7. As disclosed in the drawings, the "wall means" of a passageway or internal duct refers to the inner walls or internal opposing surfaces of a first component which extend along the length of the passageway or duct, and which define the passageway or duct. The term "surfaces" describes both components with a plurality of inner walls and the cylindrical or other curved inner walls. In the latter instance, curved inner walls comprise a plurality of arcuate or curved surfaces.

The link member wall portion 32 has an outer wall surface 54 defined between and intersecting with end wall surfaces 56, 58 (See FIG. 1). The outer wall surface is preferably configured to substantially mate with an inner wall surface of the tubular element. In the embodiment being discussed, the outer wall surface is a planar rectangular configuration to mate with the internal duct walls of the square tubular element shown in FIG. 8.

As shown in FIGS. 5, 6, and 7, when the link members are assembled their thickness is such so that a centrally located wire-way 92 is formed. As shown in FIG. 2, a hand hole 62 may be formed in a link member to permit access to the wire-way 92. A hole in the tubular element which coincides with the hand hole 62 may be formed to permit access to the wire-way 92 after the joining device is installed and the tubular element is in its final desired position. A cover plate may be used to keep out dirt and moisture.

A key part of the preferred method and apparatus of this invention is securing or fastening the link members of the enlarged or expanded joining or coupling device 102 together into a unitary support block to maintain the link members engaged in their supporting contact with the inner wall surface of the passageway or duct.

To accomplish this securing or fastening in this embodiment, each of the opposing end portions 34 and 36 have a bore formed therethrough. Thus, bores 64 are formed through tenon or projecting means 38, 40 on wall end portion 34. Similarly, bores 66 are formed in wall end portion 36 which have tenon receiving spaces 50, 52 formed therein. When such link members are assembled together, as shown in FIG. 4 through 7, bores 64 and 66 are aligned. As will be described hereinafter, rod-type means are inserted through aligned bores to secure the link members together into a unitary structure.

Referring now to FIG. 8, there is illustrated in a plan view of an expanded joining device 102 (shown in outline form) with the link members engaged in support contact with inner walls 112 which define an internal duct 114 of a tubular element 110. An outer wall surface 116 of the tubular element surrounds the inner wall 112 and duct 114.

The link members 30, 70, 80 and 90 in the assembly 100 are moved radially with respect to each other by bolt-nut means generally indicated at 120. A bolt 122 has a head 124 on one end of a shank 126, which has threads 128 formed on the other end. The shank is inserted through bores 130 formed in overlapping end segments of collar segments 142, to be described in detail later. The shank then continues through a bore formed in tubular element 110 and a bore 132 formed in the link member being moved. The nut 134 is screwed onto the threaded shank and tightened to hold the outer wall surface 54 of the link member engaged in supporting contact with inner wall surface 112. The other three link members are similarly moved into supporting contact with the inner wall surface 112. Alternatively, threads may be formed in bore 132 to mate with the threads 128 on shank 126, to also enable a link member to be pulled into supporting contact engagement with an inner wall surface 112, and to form a unitary structure as described hereinafter.

The just-discussed method and apparatus for radially moving the link members with respect to each other to enlarge or expand the coupling assembly 100 is shown in the drawing because it is the preferred method since it provides the strongest joining apparatus. However, other means for moving the link members with respect to each other can be used, including those described in the prior art patents discussed hereinbefore. This includes the turnbuckle mechanism to expand spreaders, bolt rotation to slide a clamp, a bolt through one of two opposed expandable members with a bolt end in a blind aperture of the other expandable member, camming expandable members with an actuating screw, and the like.

In such other expanding means, the link members are not necessarily connected to the tubular element, and do not need to be. That is, the most common method of mechanically attaching a tubular element is to slide the bottom of the tube over a fixed size inner sleeve, which is preferably sized to accept a press fit inside of the tube. As noted hereinbefore, such a mechanical attachment is unacceptable because of the tolerance variations in manufacturing both the tube and the fixed size inner sleeve.

With this invention, the mechanical attaching device achieves the ideal result intended for the fixed size inner sleeve. That is, by moving the link members with respect to each other into contact engaging position, and then securing those members together into a unitary structure in that contact engaging position, a fixed inner sleeve type device is obtained which has a zero tolerance fit between the tube and the coupling device. This method and apparatus removes all of the objections to the fixed inner sleeve utilized in the prior art.

In some applications, it is sometimes desirable to have an even stronger joining apparatus for exceptional loading conditions. In such applications the unitary support block may, in effect, be attached to the anchor means twice. Alternatively, the method and apparatus may also be used with only one attachment to the anchor means in some applications.

Referring again to FIG. 8, a collar means 140 may be used for purposes discussed in the previous paragraph. The collar 140 is disposed around the outer wall surface 116, and has an inside configuration enabling the collar to mate with the outer wall surface, which in this instance is square or rectangular.

The collar 140 includes a plurality of collar segments 142, one of which is shown in perspective in FIG. 9. The segment approach avoids the problems that would be encountered if the collar were a one-piece construction. These problems would include the manufacturing tolerances discussed hereinbefore with respect to joining a fixed sleeve with the inside of a tube.

Each of the segments 142 has segment ends 144, 146 formed to enable lapped relationships with ends of contiguous segments, whereby a connecting means can be used to connect segments, and to connect the collar to the unitary support structure inside of the internal duct. The lapped or overlapped segment ends 148 have a step configuration 150 formed therein providing a riser. The step configuration of one end segment mates with a step configuration of a contiguous lapping segment end. The riser of one step configuration cooperates with a mating riser on a step configuration of a contiguous segment in an abutting relationship to stabilize the segments against movement in an interlocked connection. Ears 152 are formed on each collar segment 142, and each ear has a bore 154 to receive an anchor bolt or other means for connecting a collar to an anchor means or other structural element. The bolt 122, bores 130, 132, and nut 134 for connecting the collar 140 to the unitary structure were described hereinbefore.

Method and apparatus will be described later for connecting the unitary structure directly to an anchor means or to an intermediate base plate. However, such a connection may be omitted under lower load conditions. Conversely, in higher load conditions it may be desirable to utilize both the collar and direct connection of the unitary structure to an anchor device or intermediate base plate or other structural element.

Referring now to FIG. 10, there is shown an exploded view in perspective of the joining apparatus of this invention, which further illustrates and adds to the apparatus shown in the plan view in FIG. 8. A tubular element 110 is depicted in phantom lines, and will rest on a base plate 160 in the assembled version. The base plate 160 is shown in full in FIG. 11. In this embodiment the base plate 160 is connected to an anchor means by anchor bolts 186 which extend up through bores 164 formed in ears 162 of the base plate. The base plate 160 also has bores 168 formed therein which are located to be aligned with securing bores 64, 66, so that the unitary structure 104 can be connected directly to the base plate with the same bolt and nut combination that secures an expanded coupling device together into a unitary structure. A wire-way 166 is also formed in base plate 160, which is aligned with the wire-way 92 formed by assembled link members.

When the assembly of link members is nested inside of the tubular element as a joining device, the size of the joining device is enlarged or expanded by bolts 124 and nuts 134 as described hereinbefore. This expanded coupling device then has the link members secured together into a unitary structure by means indicated generally at 170, which includes bolts 172 inserted through aligned bores 64, 66 formed in the assembled link members. In this embodiment the bolts 172 are long enough to also extend through the bores 168 formed in the base plate 160. Washers 182, plate and/or lock types, are placed on the threaded ends of bolts 172, and nuts 180 are screwed on the bolts. The nuts 180 are tightened to secure the expanded assembly of link members into a unitary structure, and to also connect the unitary structure 104 to base plate 160.

If collar segments 142 are utilized, they are attached as described hereinafter, and the anchor bolts 186 are extended upwardly through ears 162, and washers, plate and/or lock types, 192 and nuts 190 are applied to anchor bolts 186 to connect the collar 140 to both the base plate 160 and to the anchor means. As noted hereinbefore, the base plate 160 may be omitted under lighter loading conditions and the collar 140 connected directly to the anchor means.

The bolt means utilized in this embodiment are representative of a number of different ways for securing the assembly into a unitary structure 104. The bolts are the preferred embodiment because they are standard, off-the-shelf parts, which are relatively inexpensive. Moreover, they serve an important second function. That is, the bolts can be inserted through the aligned bores in the link members and the nuts attached loosely to serve as a means for retaining the link members in their assembled form for shipping and handling purposes, as when nesting the assembly inside the tubular member. Loss of loose parts is avoided.

While bolts and nuts are readily available, they are representative of rod means insertable through the aligned bores for retaining the link members assembled together. Means can be associated with each end of the rod means for securing the assembled link members into a unitary structure. For example, threads may be formed on both ends, and nuts screwed on both ends. Alternatively threads may be formed in the top or bottom bore of link members. The rod means may then be screwed into the threaded bores. The other end of the rod means may have a regular bolt head or a thread-nut combination enabling securing of the link members into a unitary structure.

The aligned bores in the link members are sized with respect to the size of the rod means to permit movement of the link members with respect to each other while the rod means or bolts are inserted in the aligned bores. Thus, the link members may be moved into the desired inner wall engaging contact and support position.

FIGS. 12 and 13 are front elevational views of the two types of link members which can be combined into an assembly (shown in FIG. 14), which can be utilized to support a tubular element having a rectangular cross-section. In FIG. 12 the link member has a longer wall portion 200 with tenons 202 on one wall end portion and tenons 204 on the opposing wall end portion. In FIG. 13 the link member has a wall portion 206 which is shorter than the wall portion 200 in FIG. 12, and further has tenons 208, 210 on opposing wall end portions. In FIG. 14, the assembly generally indicated at 212 has an opposed pair of longer wall portion 200 link members, and an opposed pair of shorter wall portion 206 link members to mate with and support corresponding longer and shorter inner walls of a tubular element with a rectangular cross-section.

Referring now to FIGS. 15 and 16 there is illustrated a front elevational view and a plan view, respectively, of an assembly of link members to support a tubular element which is tapered from a larger cross-section at the anchor base end to a smaller cross section at the other end. The degree of taper has been exaggerated to more clearly show the construction of the link members.

A tapered unitary support block is generally indicated at 220. In this embodiment there are four identical link members 222 which form the support block, to fit into a tapered tubular element which has square cross-sections. Obvious variations can be made for other regular and irregular polygonal cross-sections and circular cross-sections of tapered tubular elements.

Each link member 222 has a tapered wall portion 224 with opposing wall end portions 226, 228, which are tapered as part of the overall wall portions 224. Tenons 230, 232 are formed in one wall end portion 226, and offset tenons 234, 236 are formed in the opposing wall end portion 228. Tenon receiving spaces 240, 242 and 244, 246 are defined by tenons 230, 232 and 234, 236, respectively. Aligned bores 248, 250 accept rod-type securing means. A wire-way 260 is formed by assembling four link members 222.

Referring now to FIGS. 17 and 18, there is illustrated a plan view of an embodiment for a tubular element 270 that has a round or circular cross-section, and a plan view of a link member which may be used in this embodiment. The tubular element 270 has an inner wall surface 272 which defines an internal duct 274. An outer wall surface 276 of the element 270 surrounds the inner wall 272 and duct 274. A unitary support block 280 is shown in phantom lines in engaging support contact with the inner wall 272 of the duct 274.

The support block 280 may be formed from four link members as are illustrated in FIGS. 5, 6 and 7 hereinbefore, and such a support block will be adequate for most loading conditions. However, under certain varying loads it may be desirable to utilize link members formed as shown at 282 in FIG. 18.

The link member 282 has a wall portion 284 with an outer wall surface 286, and opposing end wall surfaces 288, 290. The outer wall surface 286 and spaced end wall surfaces 288, 290 intersect at opposite ends of the outer wall surface. In this embodiment those intersections have been rounded off as shown at 292 and 294, preferably in arcuate shape corresponding to the arcuate shape of the inner wall surface 272.

The rounding of the wall intersections removed the sharp corners at the intersection. As noted, non-rounded corners will perform adequately under certain loading conditions. However, some loading, such as varying loads due to unusual varying wind conditions and the like, may produce stressing or even a cutting effect on the wall surface that is not desirable. In fact, it is desirable to slightly round these corners, even when not used with round tubular elements, to avoid any possible stressing, when contact with flat inner walls is primarily with a substantially flat or planar outer wall surface of the link members.

Although not shown in FIG. 17 the assembly of link members 284 is secured together into a unitary support block by cooperating rod means and aligned bores as described hereinbefore. Similarly, the support block 280 is attached or connected to a base plate or anchor means as described herein.

Also, as discussed herein, it is desirable to use a collar means indicated generally at 300 as an alternate or additional connection between the support block 280 and an anchor means. As before, the collar means may also be used to connect the tubular element 270 to the support block 280.

The collar means 300 advantageously comprises a plurality of collar segments 302. Although four are required in this instance, only two are shown to more clearly lay out their shape and function. Each of the segments 302 has segment ends 304 formed to enable lapped relationships with ends of contiguous segments, whereby a connecting means can be used to connect segments, and to connect collar 300 to the unitary support block 280 inside of the tubular duct. The lapped or overlapped segment ends 304 have a step configuration formed therein providing a riser, which mates with a similar step configuration of a contiguous lapping segment end. This strengthens and holds the segments in an abutting relationship to stabilize the segments in an interlocked connection.

Ears 306 are formed on each collar segment 302. Each ear has a bore or slot 308 to receive an anchor bolt or other means for connecting the collar to an anchor means. Projection lines 310 indicate bolt or other means for connecting the collar segments 302 together and to the unitary support block 280, as discussed hereinbefore with respect to FIG. 8. The inner surface of the collar segments are formed or shaped or configured to mate with the outer wall surface 276 of the tubular element 270. If any of the tubular elements have decorative fittings, the inner collar surface may be made to fit over and around such flutings to insure a non-slip fit and grasp on the tubular element.

Referring to FIG. 19, there is illustrated a further embodiment of this invention which shows an assembly 320 suited for use with a tubular assembly that has a round or circular cross-section. FIG. 19 is a disclosure of link members 322 in which each of the wall portions have an outer wall surface configured to substantially mate with an inner wall surface of a tubular element when the link members of the joining device are in the supporting contact position with the inner wall surface. When the cross section is circular, the outer wall surfaces of the link members are arcuate as shown.

Referring now to FIG. 20, there is illustrated an assembly 330 which illustrates embodiments useful with tubular elements having a polygonal cross-section. Assembly 330 is suited for a hexagon, by using six link members 332 connected at 120 degrees with respect to each other to mate with the inner walls of a hexagonal cross-section. Generically, this can be described as polygonal cross-section in which said inner wall has a plurality of wall segments corresponding in number to the number of sides in the polygon. There is then supporting contact by said link members with each of the plurality of inner wall segments.

Referring now to FIG. 21 there is illustrated two types of link members 340 and 344 which may be used together, especially in situations where a broader, unbroken expanse of wall portion is desired.

The first type of link member 340 has projecting means which includes a pair of tenons 342, on each of the opposing wall end portions, which are spaced apart at the top and bottom of the wall portion to define a receiving space for a tenon of an adjacent wall member, which is substantially larger than each of the defining tenons. The second type of link member 344 has projection means which includes at least one tenon means 346 on each wall end portion which is sized to fill said tenon receiving space defined by the spaced pair of tenons 342 on the first type of link member. This provides a larger wall portion in which an access or hand hole 348 may be formed between the tenons 346.

In some instances, a single bore 350 may be formed in the wall portion below the access hole 348 to receive bolt or other means for radially moving the link members with respect to each other. However, whenever there is concern that the wall of the tubular element may be weakened because of the size of the hole in the tubular element which coincides with the access hole 348, another bore 352 may be formed above the access hole 348 to enable the wall of the tubular element to be further secured to the link member 344 to strengthen the tubular element wall.

Referring now to FIG. 22 in which two link members 360 and 370 illustrate a variation of the projecting means and space for receiving the projecting means. The link member 360 has a wall portion 362. A mortise slot 366 is formed in a wall end portion 364. The link member 370 has a wall portion 372. A projecting means in the form of a tenon 376 is formed on or from a wall end portion 374.

Link members 360 and 370 are assembled by inserting the tenon 376 of member 370 into the mortise slot 366 of member 360. The slot 366 is sized to permit lateral movement of the tenon 376, in-and-out movement of tenon 376, and up-and-down movement of the tenon therein. This permits spatial adjustment between the link members with respect to each other, as each link is moved against an inner wall.

Each of the plurality of such link members in an assembly of such link members may have a tenon means on one wall end portion and a mortise slot formed in an opposing wall end portion. If there is an even number of link members in the assembly, then at least some of the link members may have tenons formed on both of the opposed wall end portions, while other link members may have mortise slots formed in both of the opposed wall end portions.

To secure an assembly together into a unitary structure a bore 380 may be formed in the wall end portion 364 above and communicating with the mortise slot 366. Similarly, a bore 382 may be formed in the wall end portion 364 below and communicating with the mortise 366. A vertical bore 386 may be formed in tenon 384, with internal screw threads formed therein. A bolt may be introduced through either bore 380 and/or through bore 382 and screwed into the threaded bore 386 in tenon 376. The bores are sized to permit movement of the link members with respect to each other to enable inner wall engagement and supporting contact with the inner wall by each of the link members. Then the bolts in bore 380 and/or 382 are tightened and the assembly is secured into a unitary structure.

Referring now to FIG. 23, there is illustrated another embodiment of a link member which may be used in this invention. A link member 390 has a wall portion 392 and opposing wall end portions 394 and 396. This link member would replace two of the link members shown in FIGS. 1 through 5. Therefore, the wall portion 392 is configured so that the one wall end portion is angled with respect to the other wall end portion so that each angled wall portion can be moved to be in the required inner wall engagement and supporting contact position.

If bolts are used in each angled wall portion to expand or enlarge the size of an assembly, then the bores in the tubular wall should be sized to permit sideways or lateral movement of the bolts with respect to the tubular wall. This would permit the link member to reach the engagement position with each of the adjacent inner walls, with the angled central portion of the link member snugly seated in the corner between the adjacent inner walls.

Obviously, this principle can be applied to other embodiments of the link members. For example, adjacent link members in the hexagonal assembly shown in FIG. 20 could be formed as a single link member with angled wall portions. Similarly, adjacent link members in the circular assembly in FIG. 19 could be formed as a single link member. This principle is applicable to almost all of the link member embodiments disclosed herein. While the most common use of the "double" link member is with another "double" link member or members, it is possible to use only one "double link" with a plurality of "single" link members.

Referring now to FIGS. 24 and 25, there is illustrated two further embodiments of link members. In FIG. 24 a link member 400 has a wall portion 402 with a pair of spaced tenons 404 on one wall end portion and a single tenon 405 formed on the opposing wall end portion. Such link members are assembled by inserting the single tenon 406 on one link member between the spaced tenons 404 on an adjacent tenon in an intermeshed relationship.

In FIG. 25, the link member has a wall portion 412 with a single long tenon 414 on one wall end portion and a single short tenon 415 on the opposing wall end portion. The pairing of a long tenon intermeshed with a single short tenon provides stability when only one tenon is formed on each wall end portion.

While the choice of the specific components and their arrangement in the preferred embodiments described herein illustrate the results and advantages obtained by the choice of those specific components over the prior art, the invention is not limited to those components and their arrangement. Thus, the forms of the invention shown and described herein are to be taken as illustrative, and changes in the components or their arrangement may be made without departing from the spirit and scope of this invention. There has been disclosed method and apparatus which differs from, provides function not performed by, and has clear advantages over the prior art.

As noted herein before, there are different ways for securing the assembly of link members into a unitary structure. The use of bolts 172 and nuts 180 in FIG. 10 was the first way described. Alternatively, as disclosed in FIG. 10, the assembly may be secured into a unitary structure by the bolts 122 which pull the link members of an assembly into the engaging support contact with an inner wall 112 of the passageway or duct 114 of the tubular element 110. When thus secured in contact with the inner wall, the planar surfaces that enable sliding engagement of intermeshed tenons cooperate to contribute stability to the unitary structure to join a first component to a second component, with the sliding engagement of the planar surfaces preventing any tilting or movement of the unitary structure or any movement of the link members with respect to each other. Under lighter loading conditions, the bolts 172 may be omitted. For heavier loading conditions, the use of the collar segments 142 which are pulled against the outer wall surface 116 by bolts 122 provide additional strength as part of the unitary structure. For the heaviest loading conditions the bolts 172, bolts 122 and collar segments 142 cooperate to provide redundant and reinforcing strength to the unitary structure.

I claim:

1. Apparatus for joining first and second components when the first component has a passageway formed therein with inner surfaces of the first component extending along the length of and defining the passageway which opens to the exterior of the first component, comprising:

(a) a plurality of members assembled into a coupling device to be placed inside of a passageway of a first component, (b) means for moving at least one of said plurality of members with respect to the other members after said coupling device is placed in such a passageway so that said members are in engaging contact with inner surfaces of a first component which extend along the length of and define the passageway, (c) means for securing said members of said coupling device into a unitary structure when said members are in said inner surfaces engaging contact in the passageway to prevent movement of said members with respect to each other in response to changing load conditions and to maintain said members and said unitary structure in a stable inner surfaces engaging contact position, and (d) means for attaching said unitary structure to a second component.

2. The apparatus as defined in claim 1 in which said means for securing said members of said coupling device into a unitary structure includes means for directly attaching said unitary structure to a second component.

3. Apparatus as defined in claim 1 in which said moving means includes means for pulling said members into said inner surfaces engaging contact, and in which said pulling means retains said members in said inner surfaces engaging contact.

4. Apparatus as defined in claim 1 which further includes means for intermeshing said plurality of members with each other when assembled into said coupling device to enable interlocking against movement with respect to each other when secured into a unitary structure.

5. Apparatus as defined in claim 1 in which said means for attaching said unitary structure to a second component includes collar means disposed around an outer surface of a first component which surrounds a passageway formed in the first component for enabling connection of said unitary structure to a second component.

6. Apparatus as defined in claim 5 which further includes means for connecting said collar means to said unitary structure when said collar means is disposed around an outer surface of a first component.

7. Apparatus as defined in claim 1 in which said moving means includes means for pulling said coupling device members into said inner surfaces engaging position.

8. Apparatus as defined in claim 7 in which said pulling means includes means for engaging said coupling device members and means for engaging a first component with a passageway formed therein, whereby said coupling device can be connected to a first component when said coupling device is placed in a passageway thereof.

9. Apparatus as defined in claim 1 in which, (a) said coupling device members are link members, each of said link members having a wall portion with opposing wall end portions, (b) said wall end portions of at least some of said link members having at least one tenon means formed thereon and at least some wall end portions of some of said link members having tenon means receiving space formed therein for enabling intermeshing and assembling said plurality of link members into a coupling device by inserting tenon means on one wall end portion of a link member into tenon means receiving space formed in a wall end portion of another link member.

10. Apparatus as defined in claim 9 which includes a bore formed in each wall end portion of each link member, said bores being formed so that when a tenon means on a wall end portion of one link member is inserted into a tenon means receiving space formed in a wall end portion of another link member said bores in such wall end portions are aligned, and which further includes means insertable through said aligned bores for securing said link members together into a unitary structure.

11. Apparatus as defined in claim 1 in which tenon means are formed on both of said wall end portions of a link member, said tenon means on adjacent wall end portions of said assembly of link members being offset with respect to each other to define said tenon means receiving space to enable tenon means of said adjacent wall end portions to intermesh when said link members are assembled into said coupling device.

12. Apparatus as defined in claim 11 in which said tenon means have planar surfaces formed thereon, whereby said planar surfaces on tenon means on adjacent wall end portions cooperate to enable sliding engagement of intermeshed tenon means to enhance stability of said coupling device.

13. Apparatus as defined in claim 12 in which said planar surfaces on said tenon means are perpendicular to an axis of said coupling device, said axis defining a reference for radial movement of said link members, whereby said link members are retained in alignment with respect to said axis to prevent tilting of said coupling device with respect to said axis in response to loads on the first component.

14. Apparatus as defined in claim 1 in which said means for securing said members into a unitary structure includes means for retaining said members against inner surfaces of a passageway in said inner surfaces engaging contact position after they have been moved into said engaging contact.

15. Apparatus as defined in claim 14 which further includes collar means disposed around an outer surface of a first component which surrounds a passageway formed in the first component for enabling retaining said members in said inner surfaces engaging contact position.

16. Apparatus as defined in claim 15 in which said collar means includes means for attaching said unitary structure to a second component.

17. Apparatus as defined in claim 15 in which said plurality of members are connected to said collar means to retain said members in said inner surfaces engaging contact.

18. Apparatus as defined in claim 17 in which said means for moving said members includes means for pulling said members into said inner surfaces engaging contact and connecting said collar means to said plurality of members.

19. Apparatus for joining a support element to a tubular element which has an outer wall surface and an internal duct wall surface, comprising;

(a) a plurality of wall-shaped modules, each of said modules having opposed end portions, (b) means for assembling said wall-shaped modules into a joining device to be nested in an internal duct of a tubular element, (c) means for moving at least one of said assembled modules with respect to the others so that said modules are in supporting contact with an internal duct surface of a tubular element in which said joining device is nested, (d) means for fastening said modules of said joining device into a unitary support block with said modules in said supporting contact position with an internal duct surface of a tubular element, said fastening means preventing movement of said modules with respect to each other in response to changing load conditions and maintaining said modules and said unitary support block in stable contact with an internal duct wall surface of a tubular element, and (e) means for connecting said support block to a support element.

20. Apparatus as defined in claim 19 which further includes means for connecting said support block to a tubular element when said support block is nested in supporting contact with an internal duct surface thereof.

21. Apparatus as defined in claim 19 in which said means for moving said modules includes means for engaging said modules and connecting said modules to a tubular member when said modules are nested in an internal duct thereof.

22. Apparatus as defined in claim 19 in which said means for connecting said support block to a support element includes, (a) a plurality of collar segments adapted to be assembled around an outer surface of a tubular member into a complete collar, (b) means for connecting said collar segments together and to said support block through an outer surface of a tubular member when said support block is nested therein, and (c) means formed on said collar segments enabling attachment to a support element.

23. Apparatus as defined in claim 19 in which said means for assembling said wall-shaped modules into a joining device includes projecting means formed on and receiving space for said projecting means formed in said module end portions, for enabling assembly of said modules by inserting a projecting means for one module into a receiving space formed in another module until all modules are assembled together into said joining device.

24. Apparatus as defined in claim 23 in which (a) said receiving space for projecting means comprises mortise space, and (b) said projecting means comprises tenons for insertion into a mortise space.

25. Apparatus as defined in claim 23 in which (a) said projecting means are tenons, and (b) in which said receiving space for projecting means is defined by further tenons on said module end portions which are offset from tenons on other module end portions, whereby when said modules are assembled into said support block said tenons on adjacent modules are intermeshed.

26. Apparatus as defined in claim 25 in which said means for fastening said modules together into a support block includes, (a) aligned bores formed in intermeshed tenons on adjacent modules, and (b) means insertable through said aligned bores for fastening said modules together.

27. Apparatus as defined in claim 26 in which said fastening means includes bolt means having a shank with threads formed thereon which is inserted through said aligned bores, and threaded means for cooperating with said shank threads to enable said bolt to be tightened into module fastening position.

28. In combination;

(a) a tubular wall forming an elongated tubular element having inner wall surfaces extending along the length of and defining an internal duct and having an outer wall surface on said tubular element surrounding said internal duct, (b) an anchor means for retaining said tubular element in a desired position, (c) a plurality of link members, each of said link members having a wall portion with opposing end portions, (d) means for assembling said link members into a joining device to be nested in said internal duct of said tubular element, (e) means for moving at least one of said link members in said joining device with respect to the other members to place said link members in supporting contact with said inner wall surfaces of said tubular element when nested therein, (f) means for securing said link members in said joining device into a unitary support block with said link members in said inner wall surfaces contact support position, said securing means preventing movement of said link members with respect to each other in response to changing load conditions and maintaining said members and said unitary support block in a stable support contact position with said inner wall surfaces of said duct, and (g) means for connecting said unitary support block to said anchor means.

29. The combination as defined in claim 28 in which each wall portion of each link member has an outer wall surface and spaced end wall surfaces intersecting with opposite ends of said outer wall surface, said end wall surface and outer wall surface intersections being rounded off to prevent stressing, cutting, and other injury to said tubular element.

30. The combination as defined in claim 28 in which the thickness of said wall portion is small enough so that when assembled into said joining device a centrally located wireway is formed through said joining device.

31. The combination as defined in claim 30 in which said wall portion of one of said link members has a hole formed therein, and in which a wall of said tubular element has a hole formed therein which coincides with said hole in said one link member, thereby permitting access to said wire way.

32. The combination as defined in claim 28 in which said means for connecting said support block to said anchor means includes, (a) collar means configured to mate with and be disposed around said outer wall surface of said tubular element for connection to said support block in said internal duct, and (b) means for connecting said collar means to said support block through said outer wall of said tubular element.

33. The combination as defined in claim 32 in which said collar means has a plurality of ears formed thereon enabling attachment of said collar means to said anchor means.

34. The combination as defined in claim 28 in which said means for connecting said support block to said anchor means includes means for directly attaching said support block to said anchor means without impairing the strength of said tubular element.

35. The combination as defined in claim 34 in which said means for securing said link members into a unitary support block is utilized to directly attach said support block to said anchor means.

36. The combination as defined in claim 28 in which said tubular element has a polygonal cross-section and in which said inner wall surfaces has a plurality of inner wall segments corresponding in number to the number of sides in said polygonal cross-section, there being supporting contact by said link members with each of said plurality of inner wall segments.

37. The combination as defined in claim 36 in which said wall portion of at least one of said plurality of link members is configured so that said wall portion mates with at least two adjacent inner wall segments.

38. The combination as defined in claim 28 in which each of said wall portions of said link members has an outer wall surface configured to substantially mate with said inner wall surface of said tubular element when the link members of said joining device are in said supporting contact position with said inner wall surfaces of said tubular element.

39. The combination as defined in claim 38 in which said tubular element has a circular cross-section, and in which said outer wall surface of said link members are arcuate.

40. The combination as defined in claim 38 in which said tubular element has a rectangular cross-section, and in which said joining device has an opposed pair of longer link members and an opposed pair of shorter link members to mate with and support corresponding longer and shorter inner walls of said tubular element.

41. The combination as defined in claim 38 in which said tubular element is tapered from a larger cross-section at said anchor means end to a smaller cross-section at the other end, and in which each of said wall portions of said link members are tapered to mate with a corresponding taper of inner wall surfaces of said tubular element.

42. The combination as defined in claim 28 in which said means for connecting said support block to said anchor means includes;
   (a) collar means disposed around said outer wall surface of said tubular element for connection to said support block,
   (b) said collar means having means formed thereon enabling attachment of said collar means to said anchor means.

43. The combination as defined in claim 42 in which
   (a) said collar means includes a plurality of collar segments adapted to be assembled around said outer wall surface into a complete collar, and which further includes,
   (b) means for connecting said collar segments together and to said support block through said outer wall surface.

44. The combination as defined in claim 43 in which each collar segment has ends formed to enable lapped relationships with ends of contiguous segments, whereby said connecting means for said collar segments can be inserted through lapped end segments into said support block.

45. The combination as defined in claim 43 in which each segment end is formed in a step configuration to mate with a step configuration of a contiguous segment end in a lapped relationship.

46. The combination as defined in claim 45 in which each step configuration has riser means for cooperating with mating riser means of a step configuration on a contiguous segment to stabilize the contiguous segments in an interlocked connection.

47. The combination as defined in claim 28 in which said means for assembling said link members into a joining device includes projecting means formed on and receiving space for projecting means formed in said wall end portions, for enabling assembly of said link members by inserting a projecting means of one link member into a receiving space formed in another link member until all of said plurality of link members are assembled together into said joining device.

48. The combination as defined in claim 47 in which there are two types of link members, comprising;
   (a) a first type of link member in which said projecting means includes a pair of tenons on each wall end portion which are spaced apart to define a receiving space for a tenon of an adjacent link member which is substantially larger than each of said defining tenons, and
   (b) a second type of link member in which said projecting means includes at least one tenon on each wall end portion which is sized to fill said tenon receiving space defined by said spaced pair of tenons on said first type of link member, whereby an access hole may be formed between said one tenons of said second type.

49. The combination as defined in claim 47 in which
   (a) said receiving space for said projecting means comprises mortise space, and
   (b) said projecting means comprises tenons for insertion into mortise space.

50. The combination as defined in claim 47 in which
   (a) said projecting means are tenons, and
   (b) in which said receiving space for projecting means is defined by further tenons on said wall end portions which are offset from tenons on other module end portions, whereby when said link members are assembled into said joining device said tenons on adjacent modules are intermeshed.

51. The combination as defined in claim 47 in which said support block securing means comprises,
   (a) rod means for retaining said link members assembled together in said joining device,
   (b) each of said opposing end portions of each link member having a bore formed therethrough, said bores formed in said projecting means in an end portion of a first link member and in an end portion of a second link member having said receiving space formed therein being aligned when said projecting means is inserted in said receiving space so that a rod means may be introduced through said aligned bores to secure said link members together.

52. The combination as defined in claim 51 in which each said rod means comprises a bolt having a head on one end and a shank with threads formed on the other end, and further includes a nut with threads formed therein, whereby the tightening of nuts on bolts introduced through said aligned bores secures said link members into a unitary support block.

53. The combination as defined in claim 51 in which said aligned bores are sized to permit movement of said link members with respect to each other while said rod means are introduced through said aligned bores.

54. The combination as defined in claim 51 which further includes means associated with each end of said rod means for securing said assembled link members of said joining device into said unitary support block.

55. The combination as defined in claim 54 in which said rod end associated means includes threads formed on at least one rod end and threads formed in a rod receiving bore, whereby said rod end threads and rod end receiving threads cooperate to secure link members into said unitary support block.

56. A method for joining a first structural element, having a passageway formed therein in which said first element has opposing inner surfaces extending along the length of and defining said passageway which opens to the exterior thereof, to a second structural element, comprising;
   (a) assembling a plurality of members into a joining device, and nesting said joining device inside of a passageway of a first structural element,
   (b) moving at least one of the plurality of members with respect to the other members so that said plurality of members engage opposing inner surfaces of the first element and of the passageway in supporting contact therewith,
   (c) securing said members of said joining device into a unitary support block with said members in said supporting contact with the opposing inner surfaces of the first element to prevent movement of said members with respect to each other in response to changing load conditions to maintain said members and said unitary support block in a stable engaging support position with the opposing inner surfaces of the first element, and
   (d) connecting said unitary support block to a second element.

57. A method as defined in claim 56 which further includes the step of connecting said unitary support block to said first structural component.

58. A method as defined in claim 56 in which said step of connecting said unitary support block to said second element includes making said connection through said first structural component.

59. A method as defined in claim 56 in which said step of securing said members together into a unitary support block includes said step of connecting said unitary support block to said second element.

* * * * *